Aug. 1, 1939.  W. H. HOWE  2,168,031
AUTOMATIC CONTROL OF ELECTRIC POWER
Filed Nov. 8, 1935   3 Sheets-Sheet 1

INVENTOR.
Wilfred H. Howe
BY Wright Brown Quinby Mlay
ATTORNEYS.

Aug. 1, 1939.　　　W. H. HOWE　　　2,168,031
AUTOMATIC CONTROL OF ELECTRIC POWER
Filed Nov. 8, 1935　　　3 Sheets-Sheet 3
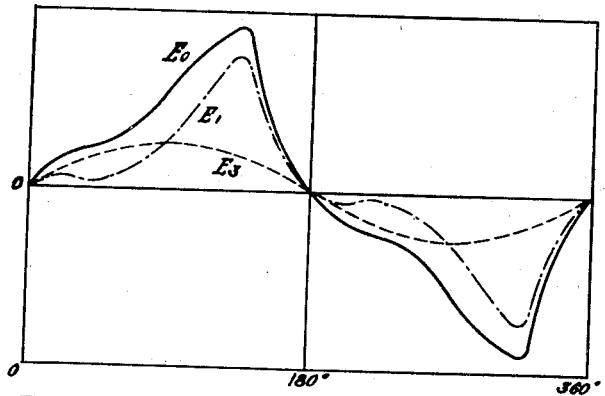
Fig. 6.
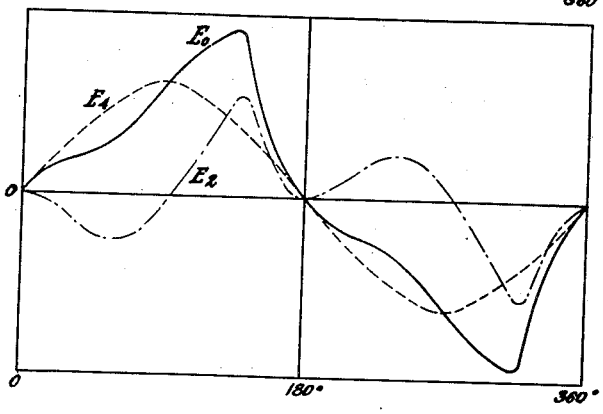
Fig. 7.
Fig. 8.
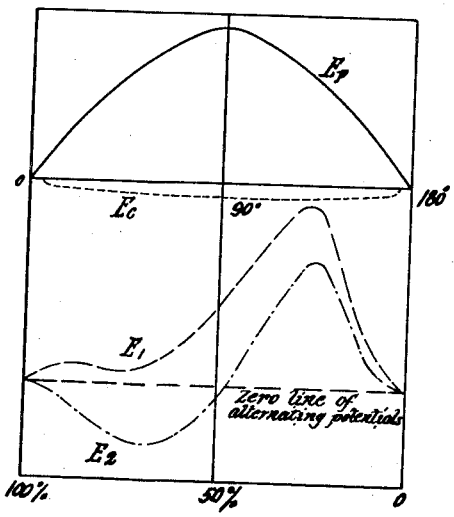
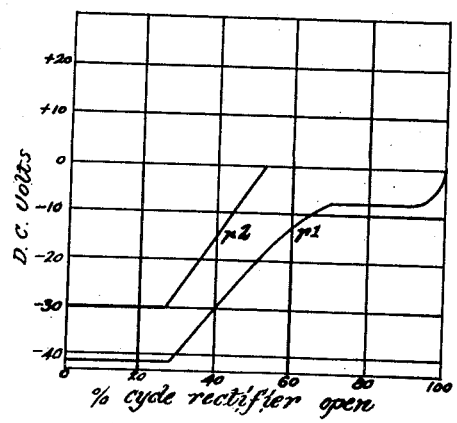
Fig. 9.
INVENTOR.
Wilfred H. Howe
BY Wright Brown Quinby May
ATTORNEYS.

Patented Aug. 1, 1939

2,168,031

UNITED STATES PATENT OFFICE 2,168,031

AUTOMATIC CONTROL OF ELECTRIC POWER

Wilfred H. Howe, Winchester, Mass., assignor, by mesne assignments, to The Foxboro Company, Foxborough, Mass., a corporation of Massachusetts Application November 8, 1935, Serial No. 48,899

4 Claims. (Cl. 250—27)

This invention relates to the control of the passage of electric power by a condition influenced by that power. In accordance with this invention such power control is produced by means including an ionic valve having a plurality of electrodes between which is impressed a cyclic voltage differential periodically reaching a value to stop current flow once started and with a control of the time of start of current flow responsive to the condition influenced by the passage of the electric power.

This is done, in accordance with this invention, by impressing on the time control a direct current controlling potential responsive to the condition, together with a complex cyclic potential having a pattern chosen in accordance with the particular control pattern desired and with respect to the inherent characteristics of the various mechanisms whose characteristics have effect to modify such condition, such, for example, as the characteristics of the ionic valve and of any mechanism directly controlled by the passage of electric power, the action of which effects such condition. This non-sinusoidal controlling circuit, which is made effective to control by variation of the direct current controlling component derived from the condition to be controlled, which varies the axis of the potential, contains two distinct alternating current potential parts. One of these alternating current potential parts has a component of the fundamental frequency of the power supply. The other of these parts has one or more components of a frequency different from that of the power supply, and the apparatus for producing it is so chosen and coordinated that when this voltage part is impressed on the remainder of the controlling circuit, the controlling circuit presents a specific continuous wave front effective to produce a desired specific continuous relationship between the controlled condition and the power passed by the valve. A specific example illustrative of this invention is shown in the accompanying drawings in which:

Figures 6 and 7 are curves showing two different values of alternating potential added to the harmonic potential of Figure 5.

Figure 8 is a curve illustrating the effect of applying the voltage shown in Figures 6 and 7 on the valve grid.

Figure 9 is a curve showing the plate current resulting from the grid voltage cycles of Figure 8.

Figure 1:
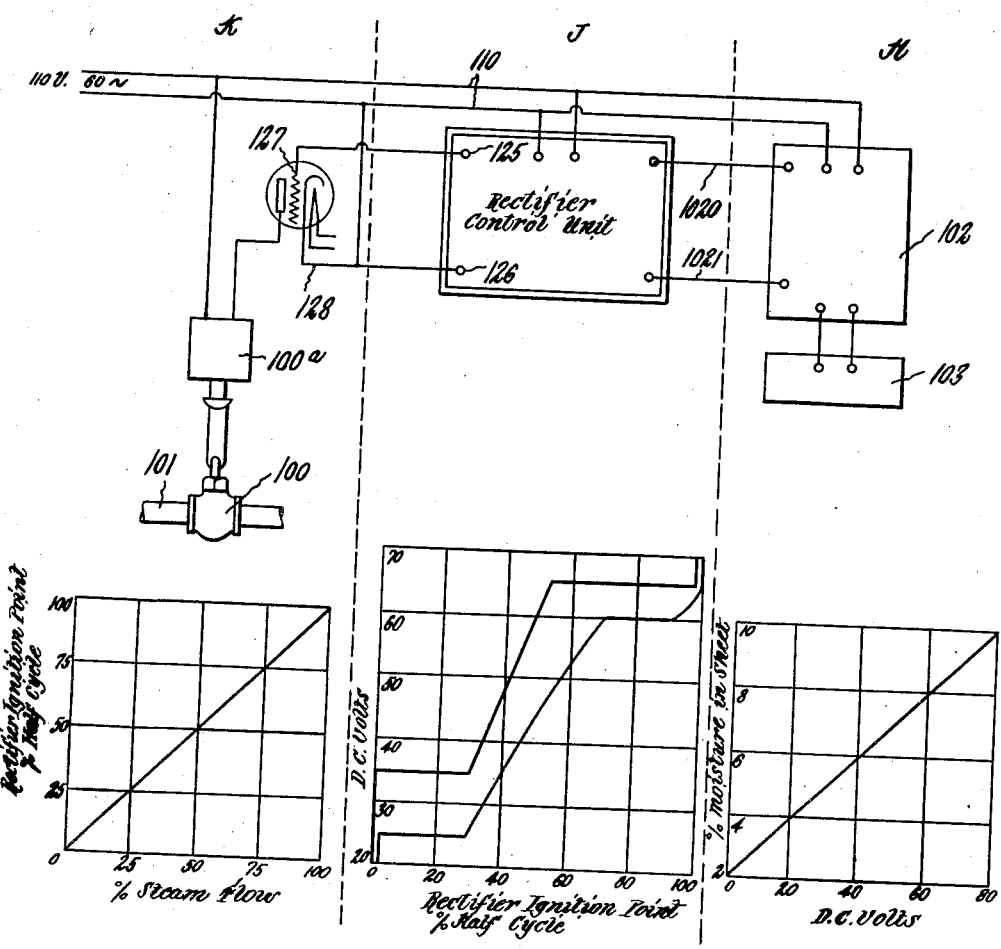
Figure 1 is a diagrammatic view of a system including a steam valve and an electric actuator and control means for a particular behavior pattern controlled by the variations in the dryness of a product dried by steam supplied through the steam valve.

In Figure 1 is shown in outline certain units in panels H, J, and K, and showing characteristic diagrams of the actions within these units in the lower portion of this figure. The mechanism 100a in panel K controls a steam valve 100 in a main 101 which may lead to the drier cylinders (not shown) of a papermaking machine, the valve being controlled from mechanism shown enclosed in the panel H and indicated at 102 and 103. The mechanism 103 may be a hygrometric element responsive to the moisture content of the paper after it leaves the drier, as, for example, as shown in the Allen Patent No. 1,781,153, November 11, 1930, and the mechanism 102 is a source of direct current voltage rectified from the alternating current mains 110 and responsive in direct current voltage to the condition of the mechanism 103, its direct current terminals being connected to the leads 1020 and 1021. In the Allen patent hereinbefore mentioned this direct current voltage actuates the moisture indicating instrument.

In the control of the steam valve 100 it may be desired to have the variations of the steam flow proportional to the variation of moisture to which the mechanism 103 responds within a limited range. If the moisture goes outside this range it may then be desired to set the steam valve to its extreme position in order that the minimum of paper shall be produced, the moisture content of which lies outside of this range. In other words, when the sheet is very dry the steam should be shut off entirely. When the sheet becomes 1½% drier than that desired, the steam valve should be adjusted to admit an amount of steam slightly less than that presumably necessary to dry the sheet to the desired point. As the sheet continues to become moister the steam flow should be gradually increased in proportion to an increase in moisture up to a point where the sheet is approximately 1½% wetter than the desired value at which point the steam should be turned on full and there left as long as there is any moisture greater than this amount in the paper. We have here a case where there is a certain desired flow of steam corresponding to any particular moisture content of the paper. This is produced by the steam valve 100 through its actuator, the solenoid 100a, the two together having the behavior characteristics peculiar to their precise constructions and different with different types of valve and with different types of electrically actuated valve opening and closing means. The electrical power is supplied through the ionic valve 127 which likewise has its own behavior peculiarities. The mechanisms 103 and 102 also have their own peculiar operating characteristics.

In accordance with this invention, therefore, apparatus is interposed between the measuring mechanism in panel H and the steam control apparatus in panel K, specifically designed in view of the behavior characteristics of the measuring apparatus and of the steam control apparatus to so control the actuation of the steam control apparatus that it effects the desired behavior control of the steam supply to the drier in accordance with the variations of moisture content of the paper. This apparatus is indicated as the rectifier control unit and is shown in panel J. Two available characteristics of this unit are shown in the lower part of this panel in the diagram.

Figure 2:
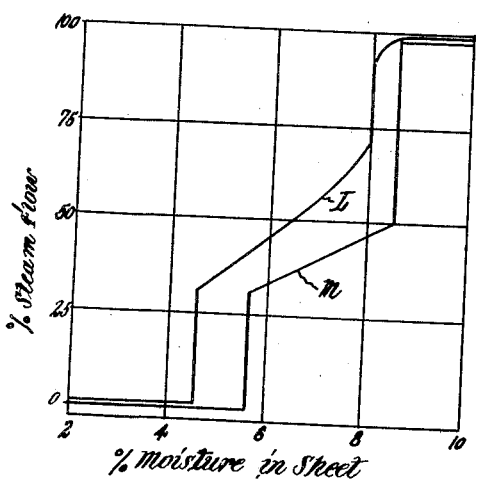
Figure 2 is a diagram showing characteristic relations between the controlling and controlled mechanisms.

Assuming the characteristics of this unit as shown, together with the characteristics of measuring and control apparatus, the resultant characteristic of steam flow plotted against moisture is shown in Figure 2. Two characteristics are there shown marked L and M. Examining curve M it will be noted that for moisture of 5½% or less the steam flow is zero and that for moistures of 8½% or more the steam flow is 100%, or in other words, the steam valve 100 is wide open. For moistures between 5½% and 8½% the steam flow varies from 30% to 50%, this variation being proportional to the variation of moisture in the sheet as affecting the mechanism 103.

Figure 3:
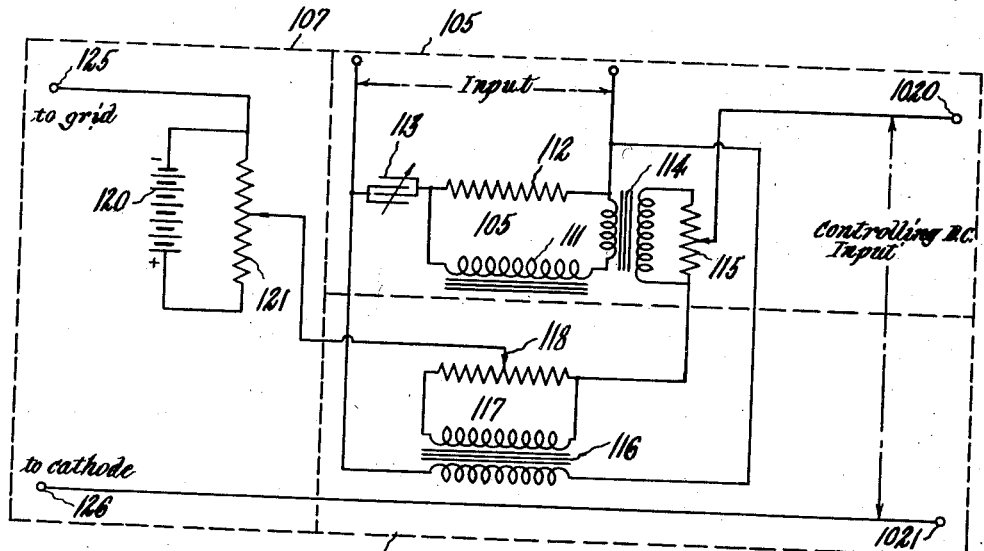
Figure 3 is a wiring diagram of one of the units shown in Figure 1.

Figure 3 shows the circuit of the rectifier control unit indicated in the central panel J of Figure 1 whose characteristic is shown in the diagram in the lower portion of this panel. Referring to Figure 3, this unit consists of three main elements. There is a source of harmonics 105, a source of fundamental frequency cyclic or alternating potential 106, and a source of direct current potential 107, all of which are independently variable and which are shown in Figure 3 set off from each other by dotted outlines. The harmonics arise from an iron cored inductance 111 of three henries value. This is supplied from the line 110 through a resistance condenser combination 112, 113 which shifts the phase of the potential applied to this inductance by 45°. Since the impedance of the resistance 112 and the condenser 113 is approximately 10% of the impedance of the inductance 111, the current through the inductance 111 is about 10% of the total in this circuit so that the current in the inductance 111 and its wave form have substantially no effect on the total. In series with the inductance 111 and between it and one end of the resistance 112 is a current transformer 114 of 1 to 10 ratio across which is connected a 750 ohm resistance 115. This is equivalent to connecting a 7.5 ohm resistance between the inductance 111 and the resistance 112. Since the impedance of the inductance 111 is approximately 1000 ohms the 7.5 ohm series resistance has a negligible effect. However, the potential across the 7.50 ohm resistance 115 will vary exactly as the current through the inductance 111. It is a well known fact that the magnetizing current in an inductance across which is impressed a sine wave electromotive force contains a considerable portion of harmonics.

Figure 4:
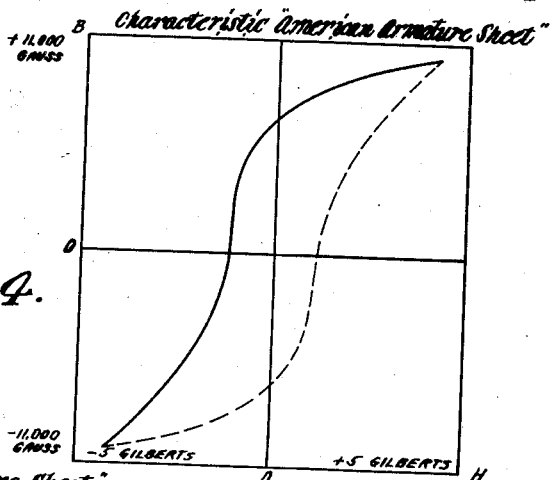
Figure 4 is a diagram of a typical B—H curve for a standard grid of laminated iron.
Figure 5:
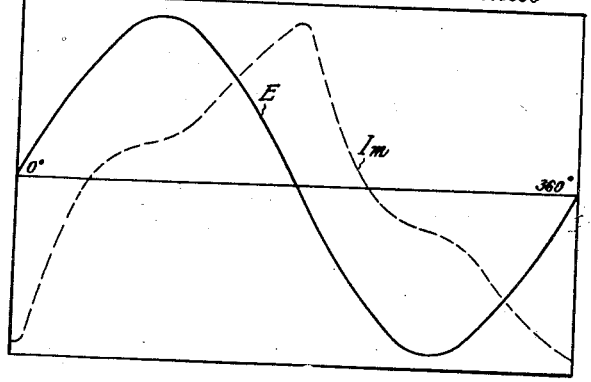
Figure 5 is a diagram showing the magnetizing current flowing through an inductance having a core of the iron of Figure 4 and on which inductance is impressed a sine wave electromotive force.

In Figure 4 is indicated a typical B—H curve for a standard grade of laminated iron and in Figure 5 is indicated the magnetizing current $I_m$ which would flow through an inductance having a core of this iron on which there is impressed a sine wave electromotive force E. It will be noted that the current $I_m$ lags the voltage E by approximately 45° and that this current contains a considerable proportion of harmonic values.

Assuming this current $I_m$ flows through the three henries inductance 111, the voltage across the resistance 115 will vary exactly with the variation of the current $I_m$ of Figure 5. In the circuit the potential E applied across this choke 111 is the same as that across the 100 ohm resistor 112. Since the resistor 112 is connected across the line in series with a capacity 113 of 25 microfarads having an impedance of approximately 100 ohms, the voltage in the resistance 112 will lead the voltage impressed from the line 110 by 45°. In other words, the voltage E shown in Figure 5 leads the impressed voltage from the line 45°. Since the current $I_m$ lags the voltage E shown by 45°, this current $I_m$ then is in phase with the applied voltage from the line and the voltage across the 750 ohm resistor 115 resulting from the current flow $I_m$ through the 1 to 10 current transformer 114 will likewise be in phase with the impressed potential. This voltage is shown as $E_0$ of Figures 6 and 7. This voltage $E_0$ is the sum of a certain amount of fundamental plus various harmonics.

The second element 106 of the control unit consists of a transformer 116 and resistor 117 which produces a sine wave of alternating potential in phase with and exactly proportional to the input potential from the line 110. This alternating potential is added to the fundamental plus harmonic potential derived from the harmonic source 105. This potential is variable by varying the top 118 on the 1000 ohm potentiometer 117. Two values of this potential are shown added to the harmonic potentials in Figures 6 and 7. These potentials are designated as $E_3$ and $E_4$ and are subtracted from the $E_0$ of these figures giving potentials $E_1$ and $E_2$.

The third section 107 of the control unit in panel J consists of a source of variable direct current potential shown as a battery 120 and a potentiometer 121, all three sections being connected in series and in series with the controlling direct current through leads 1020 and 1021 from the external source and applied as at 125 and 126 between the rectifier grid 127 and the cathode 128 (Figure 1) which rectifier controls the position of the valve actuator 100a shown as a solenoid for opening the gravity-closed valve 100. The rectifier shown is an ionic gas-filled valve of the type employing a hot cathode and with separate control of opening or ignition time. Such valves have the characteristic that if the grid voltage reaches a definite value positively, the valve opens wide for the passage of anode-cathode current when the cathode is positive, and the flow of current continues so long as conditions persist to pass current in this direction, even though the grid voltage should thereafter fall to a value so negative that the valve would not have opened had it not already been opened. Interruption of the anode-cathode current then permits the grid potential to reassume control of the opening of the valve when the anode potential is suitable.

Figure 8 indicates the effect of the alternating potential supplied from the harmonic and fundamental source upon the rectifier. As has been previously noted, these characteristics are in phase with the potential applied from the mains 110 which is likewise applied to the plate to cathode circuit of the rectifier. As will be apparent upon inspection, as the zero line of the alternating potentials varies up and down due to the direct current of the control unit plus the controlling direct current curves $E_1$ and $E_2$ (Figs. 7 and 8) move up and down, intersecting curve $E_c$ which represents the critical value of rectifier cut-off. Curve $E_2$ in the position as shown lies entirely below the curve $E_c$ and hence the tube remains closed. As the zero line and with it $E_2$ move up due to more positive direct current potential the peak of $E_2$ intersects the curve $E_c$ at about 25% full tube opening. In other words, the tube is either all off or at least 25% open. As the zero line continues to rise, the curve $E_2$ intersects the curve $E_c$ at a constantly earlier point until the tube is about 50% open at which point the rising portion of curve $E_2$ at 100% full opening intersects the curve $E_c$ at 0° of the cycle causing the tube to open full. In other words, the tube opens gradually from 30% to 50% and then in a single motion from 50% to 100%. This is shown diagrammatically in Figure 9, in the curve $r_2$. Similarly the action of the characteristic $E_1$ is shown in curve $r_1$ in this figure. It is apparent that by varying the direct current potential of the rectifier control unit, the whole curve, Figure 9, may be moved up or down at will. Figure 9 represents the action of the alternating current components supplied by the rectifier control unit. The diagram in panel J, Figure 2, indicates the control as a whole with alternating plus direct potential components.

It is apparent that by varying the fundamental components of the alternating current control any curve value between that shown at L and M of Figure 2 within the limits shown can be produced and that by varying this value outside the limits shown other curves will result. Furthermore, by increasing or decreasing the magnitude of both fundamental and harmonic components the ratio of moisture to steam flow within the smooth variation section can be varied at will. By varying the direct current potential of the rectifier control unit, the entire characteristic of Figure 2 may be moved to the right or left, the action occurring within any desired limits of moisture. Furthermore, by varying the capacity of the condenser 113 of the harmonic source of Figure 3, the harmonic characteristic may be displaced to the right or left thereby varying the minimum amount of steam flow up or down as may be desired. Further variation will result by varying the phase of the fundamental alternating current control relative to the phase of the anode-cathode voltage. These variations indicate roughly a few of the possibilities. By suitable combinations of resistors, iron inductances, and capacity almost any desired wave form or wave forms can be produced resulting in almost any desired response characteristic of the rectifier control unit and thereby resulting in any desired continuous relationship between the controlling direct current potential and the response of the rectifier and giving any desired relation between sheet moisture and steam flow, taking into account the inherent characteristics of the responsive means, of the ionic valve, and of the steam valve and its actuator.

The method of control by which the corrective mechanism is varied automatically as a function of the departure of the desired characteristic from a definite value within narrow limits and outside of these limits without reference to the precise amount of departure, and also the method shown of controlling the output of the ionic valve are not claimed herein, but form subject matter of co-pending applications.

From the foregoing description of an embodiment of this invention by way of example, but without limitation thereto, it should be evident to those skilled in the art that many modifications and variations might be made without departing from the spirit or scope of this invention as defined by the appended claims.

I claim:

1. In a system including an electrical apparatus having a condition to be controlled, a source of power, an ionic valve having separate control of ignition time for controlling the passage of electrical energy from said source to said apparatus, and a control circuit for said ignition time impressing on said control a variable controlling direct current potential derived from said condition and alternating current potential containing at least one component of the same frequency as said source, means producing an alternating current voltage having a component of a frequency different from that of said source, and means impressing said alternating current voltage on said control circuit, said producing means being designed to produce a continuously defined wave front which when superimposed on the wave front of said controlling circuit unmodified by said means produces a specific wave front effective to produce a desired continuous specific relationship between the controlled condition and the power passed by said valve.

2. In a system including an electrical apparatus having a condition to be controlled, a source of power, an ionic valve having separate control of ignition time for controlling the passage of electrical energy from said source to said apparatus, and a control circuit for said ignition time impressing on said control a variable controlling direct current potential derived from said condition and alternating current potential containing at least one component of the same frequency as said source, means producing an alternating current voltage having a component of a frequency harmonically related to that of said source, and means impressing said alternating current voltage on said control circuit, said producing means being designed to produce a continuously defined wave front which when superimposed on the wave front of said controlling circuit unmodified by said means produces a specific wave front effective to produce a desired continuous specific relationship between the controlled condition and the power passed by said valve.

3. In a system including an electrical apparatus having a condition to be controlled, a source of power, an ionic valve having separate control of ignition time for controlling the passage of electrical energy from said source to said apparatus, and a control circuit for said ignition time impressing on said control a non-sinusoidal alternating potential the position of the axis of which is varied in response to variations in said condition, said non-sinusoidal alternating current potential containing at least one component of the same fundamental frequency as said source, means producing an alternating current voltage having a component of a frequency different from that of said source, and means impressing said alternating current voltage on said control circuit, said producing means being designed to produce a continuously defined wave front which when superimposed on the wave front of said controlling circuit unmodified by said means produces a specific wave front effective to produce a desired continuous specific relationship between the controlled condition and the power passed by said valve.

4. In a system including an electrical apparatus having a condition to be controlled, a source of power, an ionic valve having separate control of ignition time for controlling the passage of electrical energy from said source to said apparatus, and a control circuit for said ignition time impressing on said control a non-sinusoidal alternating potential the position of the axis of which is varied in response to variations in said condition, said non-sinusoidal alternating current potential containing at least one component of the same fundamental frequency as said source, means producing an alternating current voltage having a component of a frequency harmonically related to that of said source, and means impressing said alternating current voltage on said control circuit, said producing means being designed to produce a continuously defined wave front which when superimposed on the wave front of said controlling circuit unmodified by said means produces a specific wave front effective to produce a desired continuous specific relationship between the controlled condition and the power passed by said valve.

WILFRED H. HOWE.